Sept. 23, 1969   B. A. BENSON   3,468,049
CALENDAR
Filed Feb. 21, 1967   5 Sheets-Sheet 1

INVENTOR
Bengt Anders Benson
BY
Sparrow and Sparrow
ATTORNEYS

Sept. 23, 1969   B. A. BENSON   3,468,049
CALENDAR
Filed Feb. 21, 1967   5 Sheets-Sheet 2

INVENTOR
Bengt Anders Benson
BY
Sparrow and Sparrow
ATTORNEYS

Sept. 23, 1969   B. A. BENSON   3,468,049
CALENDAR
Filed Feb. 21, 1967   5 Sheets-Sheet 3

INVENTOR
Bengt Anders Benson
BY
Sparrow and Sparrow
ATTORNEYS

Sept. 23, 1969   B. A. BENSON   3,468,049
CALENDAR

Filed Feb. 21, 1967   5 Sheets-Sheet 4

INVENTOR
Bengt Anders Benson
BY
Sparrow and Sparrow
ATTORNEYS

Sept. 23, 1969    B. A. BENSON    3,468,049
CALENDAR

Filed Feb. 21, 1967    5 Sheets-Sheet 5

INVENTOR
Bengt Anders Benson
BY
Sparrow and Sparrow
ATTORNEYS

United States Patent Office 3,468,049
Patented Sept. 23, 1969

---

3,468,049
CALENDAR
Bengt Anders Benson, Styckjunkargatan 5,
Stockholm, Sweden
Filed Feb. 21, 1967, Ser. No. 617,525
Int. Cl. G09d 3/08
U.S. Cl. 40—115                                      12 Claims

ABSTRACT OF THE DISCLOSURE

A calendar, useful for a series of years, which shows automatically, for any year within its range, the weekdays of every month with the correct dates, comprising two concentric rotatable members, provided with scales indicating months, weekdays, dates and years, arranged behind a front plate provided with openings or windows revealing the relevant date variables. The members are preferably mounted on a back piece joined with the front plate. The calendar may be provided with a transparent disk, disposed between the members and the front plate, having markings, such as red circles, to indicate "today's" date.

BACKGROUND OF THE INVENTION

The field of art to which the invention pertains is calendars, their construction being such and their parts being arranged as to be manipulatable to provide their use for a number of years. Such types of calendars are known. However, most of them are complicated and require skill in their manipulation. By the present invention there is provided a simple, efficient and practical calendar utilizable for a number of years.

SUMMARY OF THE INVENTION

A calendar showing date sequences of a number of years in a sequence in which two members are provided which are mounted about a common axis constituting a center of rotation whereby said members are rotatable in relation to each other, one of the members carrying a month scale consisting of twelve months of the year arranged concentrically around the center of rotation and a week day scale consisting of five weeks arranged concentrically around the center, the other of the members carrying a day date scale or table consisting of five concentric rows having a plurality of numerals arranged in a plurality of columns, such plurality of numerals including numbers 1 to 31 arranged in any seven consecutive columns of such plurality of columns, the rows being arranged concentrically around the center of rotation and a year scale consisting of a predetermined number of consecutive years arranged substantially concentrically around the center of rotation, a front plate being provided, the members being arranged behind the plate, the plate being provided with two openings, respective portions of the month scale and the week day scale and a portion of the day date scale constituting seven columns of the plurality of columns being visible through one of the openings, and a year date of the year scale being visible through the other of the openings, whereby when the said one of the members is rotated so that a portion of the month scale bearing the name of the month is visible in the said one of the openings and the other of the members is rotated so that a portion of the year scale bearing a year date is visible in said other of the openings, the week day scale and the day date scale will be so aligned, that the correct day of the week and date of the month will appear in the said one of said openings visible for each day of the week of said month and said year.

It is an object of the present invention to provide a calendar that is composed of several members and can be set not only month by month but also from year to year, and consequently can be used for a number of years.

It is a further object of the present invention to provide a calendar that is "self-calculating" insofar that when a particular month and a particular year are set, the days of the week are automatically shown with the correct dates.

It is a still further object of the present invention to provide a calendar which may be provided with a member which gives visual indication of the date of the day in question.

BRIEF DESCRIPTION OF THE DRAWINGS

The above and other objects and advantages of the invention will hereinafter appear by reference to the accompanying drawing forming a part of this specification in which like characters of reference designate corresponding parts throughout the several views in which:

In FIG. 1, the graduated disk member 10 has a scale 18 embracing all the days of the week, arranged clockwise in a series of five weeks. Another scale 20 is located outside this scale embracing the months of the year, also arranged clockwise in sequence; however, mutually displaced somewhat to comply with calendarical conditions. The name of each month is supplemented with a number, which forms a separate scale 20a, positioned above the month and disclosing the number of days in the same. The graduated disk member 10 is complemented with the graduated disk-like member 12 (FIG. 2) which presents a table 22 of dates, including five concentrically arranged rows of numbers, forming twelve columns. Further, at the bottom of this member is yet another scale 24 covering the six years from 1965–69. It will be seen from the drawings and as the description progresses that the two members 10 and 12 are mounted about a common axis constituting a center of rotation whereby members 10 and 12 are rotated in relation to each other.

The front plate 16 (FIG. 4) is preferable made of strong cardboard or other suitable material and is adapted for a wall calendar. Front plate 16 is provided with a suitably shaped opening or window 26 in which the month, day and date appear which will be described in more detail below. Arranged centrally at the bottom of front plate 16 is a recess or opening 28 in which the relevant year appears. The space below the opening 26 can be used to carry advertising text, pictures, or the like that usually appear on calendars of this type.

Figure 2:
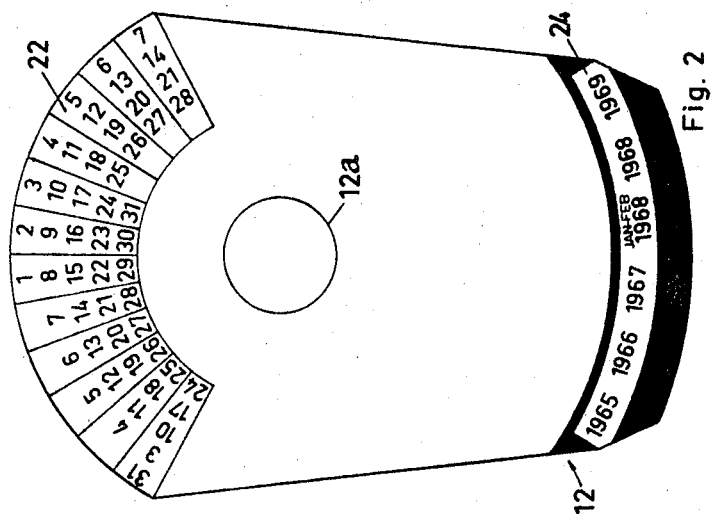
FIG. 2 is a plan view of a second member provided with graduations for dates and a year scale.
Figure 1:
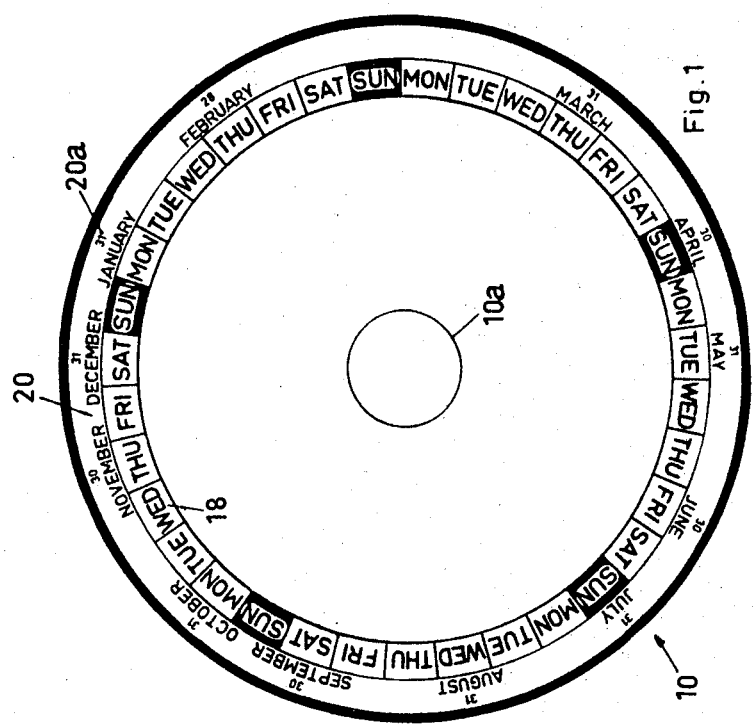
FIG. 1 is a plan view of a disk member provided with graduations for weekdays and months.
Figure 5:
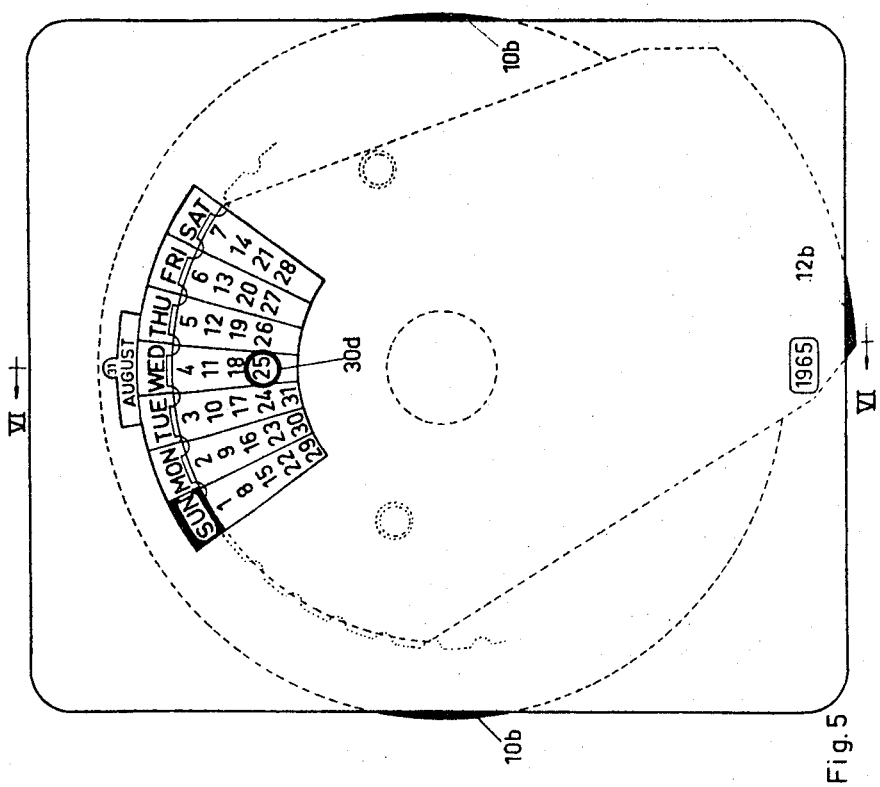
FIG. 5 is a plan view of the assembled device made in accordance with the present invention.

Members 10 and 12 form the calendar proper, member 12 being positioned over the disk member 10 so that the scales on said members are concentric, table 22 thus falling immediately below scale 18 when two members are positioned under front plate 16 so that opening 26 "frames" a month on scale 20, seven weekdays on scale 18, the latter appearing above the seven columns of date table 22, viewed through window 26, while at the same time bottom opening 28 frames a selected year of scale 24 (FIG. 5). Thus, appearing uppermost in opening 26 is the name of the month (together with a numeral disclosing the number of days in the month), then directly below the name of the month appear respectively the seven days of the week and immediately below the opening 26 framing 31 days of the date table, divided into five rows and seven columns (FIG. 5). The selected current year can be seen at the bottom of the calendar through window or opening 11. The scales are now so arranged in relation to each other so that the correct date sequence is always obtained for the specific month, appearing in opening 26, of the year, appearing in opening 28. The known mathematical principles for this arrangement will not be discussed here. It will be observed, however, from an inspection of table or scale 26 (FIG. 2), according to the example or embodiment herein shown and described, that the first day of a month appears in the first row, sixth column, and the numbers 2 to 7, inclusive, run consecutively in the same row and consecutively in the seventh to and including the twelfth column; that the second row commences with number 3 in the first column and the numbers 4 to and including 14, run consecutively in the remaining columns; that the third row commences with number 10 in the first column and the numbers 11 to and including 21, run consecutively in the remaining columns; that the fourth row commences with number 17 in the first column and the numbers 18 to and including 28, run consecutively in the remaining columns; and that the fifth row commences with number 24 in the first column and the numbers 25 to and including 31, run consecutively in the second column to and including the eighth column. The number 31 also appears in the first row of the first column for the year 1969.

In leap years, an irregular unit always appears, which is taken into consideration by the present invention by including in scale 24 two designations for years which are leap years. One, which may be provided with red digits, is marked with the designation "JAN-FEB" (FIG. 2) and the other is marked with just the year designation. As indicated, the first designation is used during January and February, whereas the other is used during the remaining months of the leap year.

To permit the manipulation of members 10 and 12, they are made in such manner to project somewhat outside the edge of the assembled calendar (FIG. 5), the diameter of disk member 10 being somewhat greater than the width of front plate 16, so that the edge portions 10b of member 10 extend outside said front plate. The lower portion of member 12 is provided with a projection, tab or lip 12b, integral with said member, and projecting beyond the lower edge of front plate 16.

FIG. 5 illustrates, as an example, the date sequence during the month of August 1965. As can be seen, the first of the month falls on a Sunday. If member 12 is moved clockwise one step, which is effected by moving tab 12b, the year 1966 appears in the opening 28, while the date table in opening 26 moves simultaneously one step to the right. The calendar will now show the date sequence for the month of August 1966—the 1st of August falling on a Monday. If member 10 is then rotated by moving an edge 10b until the month of September appears uppermost in opening 26, the date sequence for September 1966 is obtained—the first of the month falling on a Thursday. Thus, a calendar is obtained which, in this case, can be used during the years 1965–1969.

Figure 3:
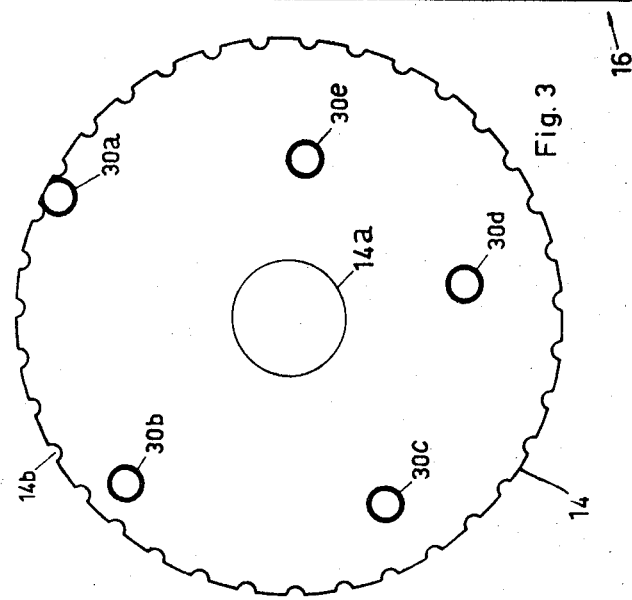
FIG. 3 is a plan view of the transparent disk with circles to indicate the date.

The calendar according to the invention may be provided with a day indicator, i.e., an indicating means which shows visually the date of the relevant day, and which can be adjusted day by day. Such an indicator may be a transparent element or disk 14 (FIG. 3). Disk 14 is placed between front plate 16 and member 12, concentrically with the scales of said member. The diameter of indicator 14 is adapted so that it projects somewhat beyond date table member 12 (FIG. 5). Indicator 14 is provided around its circumferential edge with uniformly spaced notches 14b, by means of which, e.g., by inserting a finger through opening 26, the indicator may be easily rotated. Five marking means, such as rings 30a–30c are carried for instance, in red, on indicator 14. These rings are positioned around the indicator at the same angle of distribution, but lie at varying distances from the center, so that the center point of ring 30a falls on the center line of the upper, or first row of numbers of date table 22, the center point of ring 30b on the center line of the second row, etc. The arrangement can be seen quite clearly in FIG. 5 where ring 30d sweeps over the fourth row of numbers of table 22 and can thus be made, day by day, to mark the 22nd, 23rd, etc., up to and including the 28th. FIG. 5 shows the ring 30d indicating the 25th of August. On continued clockwise rotation of day-indicating disk 14, ring 30e appears to the left of opening 26. This ring passes over the bottom, or fifth, row of numbers of date table 22, in this instance marking the 29th up to and including the 31st. In this way it is possible to indicate the date of the day in question, day by day, so that it can be seen as soon as the eye falls upon it.

Members 10 and 11 and indicator 14 may be joined to front plate 16 in several different ways, the simplest being that all are joined by means of a tubular hollow rivet, which forms a common pivot. However, such a simple method of joining the members and indicator together is encumbered with certain disadvantages. First of all, a rivet which passes through these elements will impair the attractiveness of the front face of the calendar. Secondly, the elements will be inclined to actuate each other owing to the contact pressure developed between the same near the center, because of the clamping action of the rivet, so that a member when rotated will carry with it one or more of the others, which is not suitable to the functioning of the calendar. Finally, if the elements are supported by means of one sole joining rivet at the center, it will be difficult to obtain good alignment and abutment therebetween, unless they are made unsuitably thick or rigid.

Figure 6:
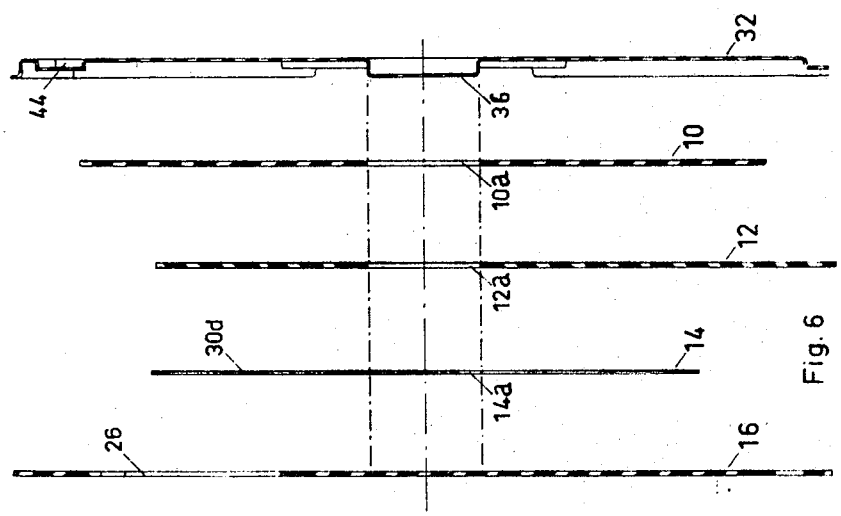
FIG. 6 is an exploded cross section of the device shown in FIG. 5 taken along the lines VI—VI.
Figure 7:
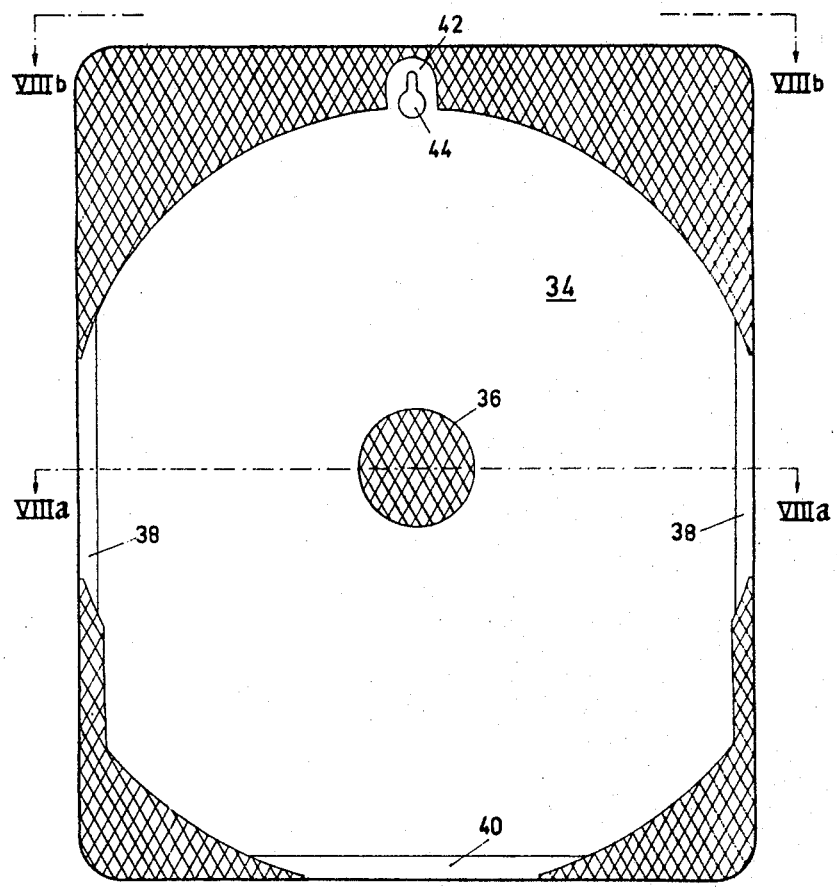
FIG. 7 is a plan view of the back plate.
Figure 8A:
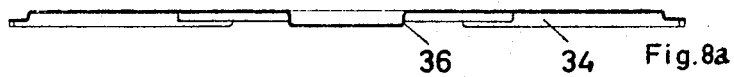
FIG. 8a is a cross-section of the back plate shown in FIG. 7, taken along the lines VIIIa—VIIIa.
Figure 8B:
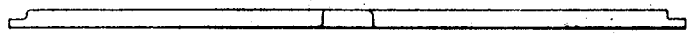
FIG. 8b is a cross-section of the plate shown in FIG. 7 taken along the lines VIIIb—VIIIb.

To avoid these disadvantages it is suggested according to the invention that the calendar be made as a closed unit, for instance, by means of a special back plate 32 (FIGS. 7, 8a and 8b). This is preferably manufactured of plastic, for instance 0.4 mm. thick polystyrene, vacuum formed in the conventional manner. For this purpose, a recess 34 is made in back plate 32 with a centrally positioned, circular, raised portion or hub 36, having a diameter substantially between 10–20% of the width of the back plate, i.e., the width of the calendar. Mounted in recess 34 are members 10 and 12, together with the indicator 14, members and indicator being provided with central openings 10a, 12a and 14a, respectively, fitting over hub 36 which thus forms a pivot or bearing point. The outer contours of back plate 32 coincide with those of front plate 16 and the two pieces are joined together for example by glueing, the glued surface or glue line extending over the surface shown in FIG. 7 by means of cross hatching. Members 10 and 12 and indicator 14 are thus contained in a chamber which is bordered by the flat front plate 16 and recess 34 in the back plate where the elements are kept well protected and aligned in relation to each other. This arrangement is shown in FIG. 6 in which the five different elements are exploded, while retaining their mutual positions. Recess 34 is designated along its sides with shallower portions 38 and along its bottom edge with shallower portion 40, the outer edges of which coincide with the outer profile of the back piece (FIG. 7) forming slots between portions 38 and front plate 16, the width of which corresponds to approximately half the depth of recess 34, and through which edge 10b of member 10 projects (FIG. 5).

A slot is formed in a corresponding manner between portion 40 and the bottom edge of the front plate, so that lip or tag 12b may be operated. To provide a simple means for hanging the calendar on a wall, recess 34 can be extended upwards by means of a small portion 42 (FIG. 7) in which a "keyhole" 44 can be punched, so that the calendar can be hung on a nail or the like.

The invention is not restricted to the shown or described embodiment but can be varied arbitrarily within the scope of the inventive idea. Thus, front plate 16 may be made of plastic, and, for instance, be provided with shallow folded edges in which back plate 32 is inserted, or with some form of guides for hub 36 of the back plate, etc. The space for the elements and their bearing peg or hub may be arranged on the front piece, particularly if this is produced by compression moulding, and the back plate may be converted into a flat cover plate, i.e., the design being the reverse of that described above.

Figure 9:
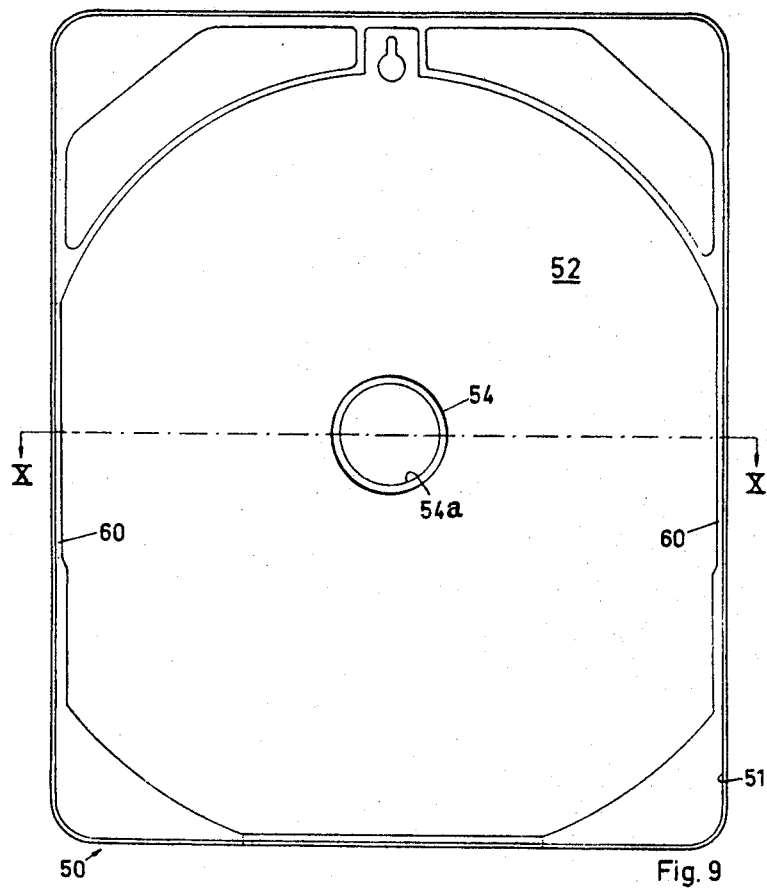
FIG. 9 is a plan view of the rear of the calendar according to another embodiment of the invention.
Figure 10:
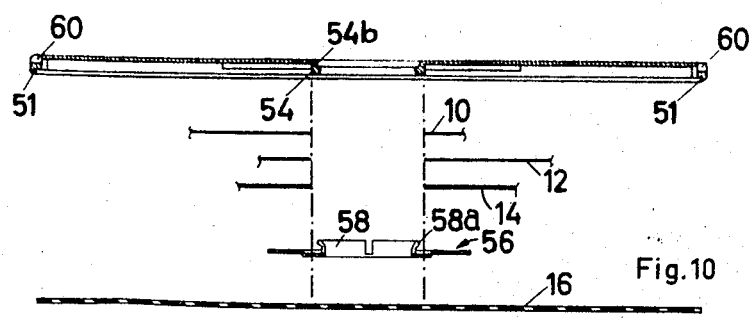
FIG. 10 is an exploded cross section of the calendar shown in FIG. 9 taken along the lines IX—IX.

FIGS. 9 and 10 show another embodiment of the casing of the calendar. Back piece 50 is comprised of compression moulded plastic, for instance polystyrene. Arranged around the perimeter is an edging strip 51 within which front plate 16 fits. As in the previous embodiment, a recess, indicated here by the reference numeral 52, is provided, which, together with the front plate, forms a "calendar space" containing members 10 and 12 and indicator 14 which are movably mounted on a central, annular hub 54 or the like. Hub 54 is provided with an opening 54a. On the rear side of the back plate, the edge of opening 54a of hub 54 is chamfered or recessed so that a peripheral shoulder or an annular groove 58b is formed. A plastic washer 56 (FIG. 10) having a resilient neck 58, is arranged to positively retain the calendar elements on hub 54. Neck 58 is intended to be pressed into opening 54a of hub 54, a peripheral edge bead 58a on neck 50a snapping into annular groove 54b. Neck 58 is suitably slotted for this purpose or divided up into mutually free flaps (FIG. 10). Since the back piece is compression moulded, the three openings or slits necessary for the manoeuvering edges or lip 10b and 12b, respectively, of the members 10 and 12, are in this case suitably arranged in the manner indicated at 60 and 62, respectively, in FIGS. 9 and 10. As can be seen, the peripheral edge portion 51 of the back plate is open along the sides and the bottom thereof so as to provide a space sufficient to allow the edges on lip 10b and 12b to protrude.

When using back plates of the last described type, "semimanufactured" items can be prepared in that the calendar members 10 and 12 are placed into the back piece 50, their respective manoeuvering edges and lip 10b and 12b being received by and guided in the slots 60 and 62, respectively. If indicator 14 is to be incorporated into the calendar, it is placed in position after which a locking washer 56 is pressed into place in opening 54a of hub 54. The required number of calendars can then be made ready from a supply of such ready-mounted back plates by mounting from case to case suitable front pieces which are inserted in front of frame forming edge 51 and secured by, for instance, gumming the corners, as indicated by the cross hatched areas in FIG. 9. No extensive binding or gummed zones are necessary in this case due to the frame fitting around the front plate.

From the foregoing description and drawings, it is evident that all scales and windows are based on a "modulus" of $1/n$ of a revolution, wherein $n$ is an integer, which in the present case, as seen in the drawings, is 5, and all scale units and windows have a tangential or angular extension of an integer times this modulus. Hence, the weekdays are arranged in $n$ (in the present case) group of one week each, the name of each day having the angular extension of $360/7n$, thus in the present case $360/35$ degrees. The same applies to the years, which each also covers $360/35°$, while each month is given twice this space, viz., $180/35°$. Correspondingly, the window showing months, weekdays and date columns has a varying angular width, i.e., $180/35°$ for the months and $7 \times 360/35 = 72°$ for the weekdays and date figures, while the year window covers $360/35°$. It could be said that the basis of the whole system is its continuity directly apparent from the closed and continuous weekday scale comprising $7n = 35$ fields, each thus having the angular extension of $360/35°$. In principle, also the date table and the year scale could be extended the whole revolution. If so, the date table would turn into five concentric rings each containing numerals 1–31 plus four blank fields, the rings thus forming together 35 columns. Also the month scale is continuous and repeats itself for every revolution, in individual months only being somewhat irregularly spaced due to their varying number of days. An extended year scale, finally, would cover 28 years, whereof 7 leap years for each of which an extra space or field for January and February is provided, altogether 35 fields, equally spaced angularly. For practical reasons, of course, the number of years covered is limited. No known self-calculating calendar is based in this way on a continuous modulus system.

Figure 4:
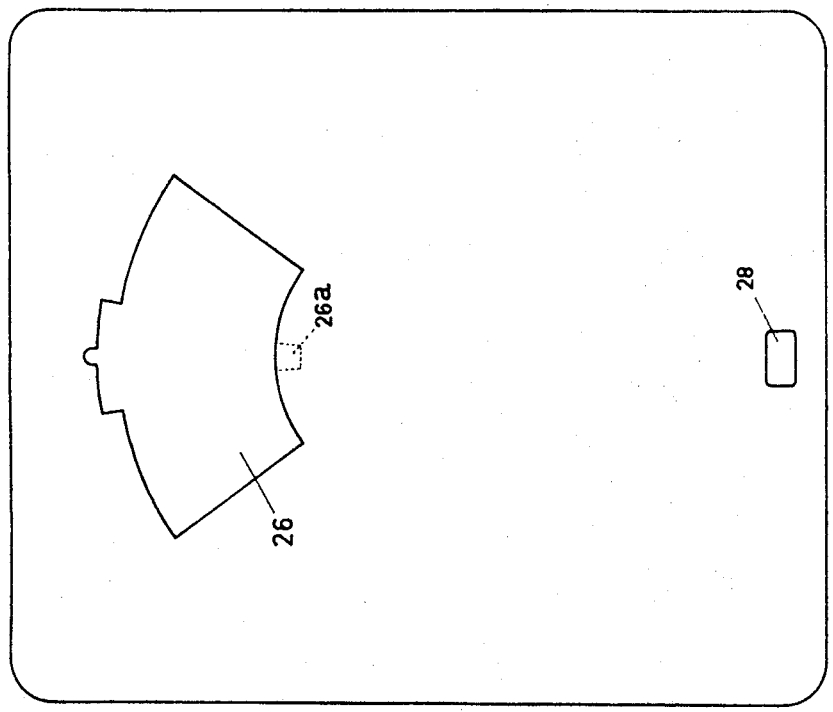
FIG. 4 is a plan view of the front plate.

Several modifications are possible, even from a pure calendar aspect, within the scope of the invention. In addition to variations determined by this type of calendar, wall calendars, table calendars, etc., other variations can be provided where openings and recesses are located in other positions on the calendar, and similarly it can be made to include a considerable number of years, even though a period of five to six years may be considered a suitable average for a calendar of this type. Further, it may be suitable to provide the calendar with information about certain festive periods, for instance Easter and Whitsuntide, which fall at irregular periods. FIG. 4 shows, with dotted lines, how opening 26 can be supplemented with a small recess 26a where such date information for the current year can appear, these being positioned radially in front of date table 22 of member 12. Other variations of the calendar are conceivable within the scope of the invention and as indicated is the same not restricted to wall calendars but can also be arranged as table calendars or the like.

While the invention has been described and illustrated with respect to certain preferred examples which give satisfactory results, it will be understood by those skilled in the art after understanding the principle of the invention, that various other changes and modifications may be made without departing from the spirit and scope of the invention.

I claim:

1. A calendar showing date sequences of a number of years in a sequence, said calendar comprising a front plate, two members mounted behind said front plate relatively rotatable about a common axis constituting a center of rotation, said members carrying scales comprising four date variables consisting of months, weekdays, dates and years, said scales arranged concentrically around said center of rotation, two of said variables being carried on one of said members and two of said variables being carried on the other one of said members, the first of said members being generally circular, carrying one of said scales on the outside of said member, said one scale comprising the names of the months arranged in consecutive order January to December, and carrying a second one of said scales comprising a week day scale within said month scale, said second scale comprising a plurality of whole weeks with the names of the weekdays equally spaced in correct order, each thereby comprising a predetermined portion of the circumference of said weekday scale, the second one of said members being located between said front plate and said first member, said second member comprising, firstly along a portion of the edge thereof a date table comprising five arcuate rows arranged concentrically around said center of rotation and having date numerals 1 to 31 arranged in a number of radial columns each one having an extension corresponding to said predetermined portion of a whole revolution (360°), the radial position and extension of said date table being located immediately within said weekday scale of said first member, said date table cooperating with said weekday scale, and said second member carrying, secondly, a year scale arranged in an area not occupied by said date table and comprising a predetermined number of year dates arranged in consecutive order, each one of said year dates having an extension corresponding to said predetermined portion of the whole revolution, said front plate having two openings, the first one of said openings having the size for showing of said date variables on said members of one month name, seven weekday names, and seven columns of said date table, and a year date appearing through the other one of said openings, said date variables being arranged on said two members for the simultaneous appearance of a certain year and a certain month in their positions in said openings, and the appearing weekdays being positioned with respect to said date table showing.

2. A calendar according to claim 1, each of said members having a portion projecting from said plate to facilitate rotation thereof.

3. A calendar according to claim 1, including a number carried by said first of said members adjacent to each month of said month scale and visible through said first opening, indicating the number of days in said month.

4. A calendar according to claim 1, and comprising a transparent element disposed between said front plate and said second of said members, said element being rotatable about said common axis, said element being provided with a plurality of marking means, so disposed on said element that each of said marking means is capable of sweeping across a row of said day date scale upon rotation of said element.

5. A calendar according to claim 4, and wherein each of said marking means is adapted to enclose a number in a corresponding row of said day date scale upon rotation of said element.

6. A calendar according to claim 4, and wherein said element extends over the edge of said day date scale and being provided with finger engaging portions to facilitate rotation thereof.

7. A calendar according to claim 1, and wherein said day date scale on said second of said members is disposed below said month scale of said first of said members.

8. A calendar according to claim 1, and wherein said year scale on said second of said members includes leap year indicia.

9. A calendar according to claim 1, and further comprising a back plate, said back plate being joined with said front plate defining together with said front plate a housing receiving said members, said back plate being provided with a centrally disposed, circular hub, said members being rotatably mounted thereon.

10. A calendar according to claim 9, and wherein said hub has a diameter substantially ten to twenty percent of the width of said calendar.

11. A calendar according to claim 9, and said back plate comprising a vacuum-formed sheet of plastic, said sheet having a recess constituting a chamber for said members, said hub consisting of a circular portion in the center of said recess.

12. A calendar according to claim 9, and said back plate comprising compression molded plastic and having around its periphery an edging strip within which said front plate fits, said hub comprising a socket integral with said back plate, a locking washer having a resilient neck, said members being adapted to be rotatably retained by said washer and being secured to said hub by press fit of said neck into said hub.

References Cited
UNITED STATES PATENTS

| | | | |
|---|---|---|---|
| 621,589 | 3/1899 | Vernon | 40—115 |
| 648,835 | 5/1900 | Biggs | 40—115 |
| 846,250 | 3/1907 | Sellers | 40—115 |
| 1,214,935 | 2/1917 | Lundberg | 40—115 |
| 1,415,686 | 5/1922 | Oppenheim | 40—110 X |
| 2,984,033 | 5/1961 | Sampson | 40—110 |

EUGENE R. CAPOZIO, Primary Examiner

WENCESLAO J. CONTRERAS, Assistant Examiner